United States Patent [19]

Fuh et al.

[11] Patent Number: 5,180,020
[45] Date of Patent: Jan. 19, 1993

[54] METHOD FOR INHIBITING THE INITIATION AND PROPAGATION OF FORMATION FRACTURES WHILE DRILLING

[75] Inventors: Giin-Fa Fuh, Ponca City, Okla.;
Nobuo Morita, Houston, Tex.;
Donald L. Whitfill; David A. Strah, both of Ponca City, Okla.

[73] Assignee: Conoco Inc., Ponca City, Okla.

[21] Appl. No.: 785,647

[22] Filed: Oct. 31, 1991

[51] Int. Cl.⁵ .................. C09K 7/00; E21B 21/00; E21B 33/138
[52] U.S. Cl. .................. 175/72; 507/104; 507/140; 507/126
[58] Field of Search .......... 175/75, 65; 507/100, 507/104, 140, 126; 166/294, 293, 292, 283

[56] References Cited

U.S. PATENT DOCUMENTS

| | | | |
|---|---|---|---|
| 2,573,690 | 11/1951 | Cardwell et al. | 166/295 |
| 2,650,195 | 8/1953 | Cardwell et al. | 175/72 X |
| 2,773,670 | 12/1956 | Miller | 175/72 |
| 2,812,161 | 11/1957 | Mayhew | 175/72 X |
| 3,053,764 | 9/1962 | Hummel et al. | 507/140 |
| 3,280,912 | 10/1966 | Sheffield, Jr. | 175/72 X |
| 3,399,723 | 9/1968 | Stuart | 175/72 X |
| 3,788,406 | 1/1974 | Messenger | 175/72 |
| 4,957,174 | 9/1990 | Whitfill et al. | 175/72 |
| 5,076,944 | 12/1991 | Cowan et al. | 507/104 |

*Primary Examiner*—Stephen J. Novosad
*Attorney, Agent, or Firm*—Richard W. Collins

[57] ABSTRACT

Fracture initiation and propagation during drilling are prevented or inhibited by including an effective amount of a specially sized solid particulate loss prevention material in the drilling fluid prior to encountering formation breakdown in a susceptible zone.

7 Claims, No Drawings

METHOD FOR INHIBITING THE INITIATION AND PROPAGATION OF FORMATION FRACTURES WHILE DRILLING

BACKGROUND OF THE INVENTION

1. Field of the Invention

This invention relates to drilling of wells, and more particularly to a method of inhibiting the initiation and propagation of fractures in susceptible zones as the drilling progresses.

In the drilling of a well into the earth by rotary drilling techniques, conventionally a drilling fluid is circulated from the surface of the earth down a drill string having a drill bit on the lower end thereof and through ports provided in the drill bit to the well bottom and thence back to the surface through the annulus formed about the drill string. Commonly, drilling fluids are employed that are either oil or water based. These fluids are treated to provide desired rheological properties which make the fluids particularly useful in the drilling of wells.

A problem often encountered in the drilling of a well is the loss of unacceptably large amounts of drilling fluid into subterranean formations penetrated by the well. This problem is often referred to generally as "lost circulation," and the formations into which the drilling fluid is lost are often referred to as "lost circulation zones" or "thief zones". Various causes may be responsible for the lost circulation encountered in the drilling of a well. For example, a formation penetrated by the well may exhibit unusually high permeability or may contain fractures or crevices therein. In addition, a formation may simply not be sufficiently competent to support the hydrostatic pressure applied by the drilling fluid and may break down under this hydrostatic pressure and allow the drilling fluid to flow thereinto.

It is this latter situation where the formation is broken down by the hydrostatic pressure of the drilling fluid to which the present invention is addressed. One of the limiting factors in drilling a particular portion of a well is the mud weight (density of the drilling fluid) that can be used. If too high a mud weight is used, fractures are created in lost-circulation zones with resulting loss of drilling fluid and other operating problems. On the other hand, if too low a mud weight is used, encroachment of formation fluids can occur, borehole collapse may occur due to insufficient hydrostatic support, and in extreme cases safety can be compromised due to the possibility of a well blowout. In many cases, wells are drilled through weak or lost-circulation-prone zones prior to reaching a potential producing zone, requiring use of a low mud weight and installation of sequential casing strings to protect weaker zones above a potential producing zone. If a higher weight mud could be used in drilling through weaker or depleted zones, then there is a potential for eliminating one or more casing strings in the well. Elimination of even one casing string from a well provides important savings in time, material and costs of drilling the well.

Thus, there is a need for a method of drilling wells using higher mud weight than could normally be used without encountering formation breakdown problems.

2. The Prior Art

Prior art techniques for dealing with formation breakdown have been remedial in nature, rather than preventive as in the case of the present invention.

Numerous techniques have been developed to control lost circulation. One common technique involves increasing the viscosity of the drilling fluid to increase its resistance to flow into the formation. Another technique involves the addition of bulk material, such as cottonseed hulls, sawdust, or ground walnut shells, to the drilling fluid. In addition, asphaltic materials including gilsonite have been added to both water base and oil base fluids to prevent the loss of drilling fluid from the well into surrounding formations. For example, in U.S. Pat. No. 2,773,670 to Miller, there is taught a method of correcting lost circulation by adding asphaltic material to drilling fluids. These materials are added to the drilling fluid in the form of discrete particles and are suspended as such in the fluid where they are carried down the drill pipe and thence via the annulus between the pipe and the well bore to the lost circulation zone. Upon reaching the lost circulation zone, due in part at least to the elevated temperatures and pressures found in the well, the asphalt particles attach themselves to the formation and are fused or bonded to one another and to the formation structure to form an effective seal against the passage of drilling fluid into the formation.

The use of gilsonite in suitable granular form in an aqueous carrier liquid for correcting lost circulation is taught in U.S. Pat. No. 2,812,161 to Mayhew. The granules of gilsonite are simply mixed with a portion of aqueous drilling mud and pumped into the well bore so that the mud will carry the gilsonite granules to the leaking strata and force them into the crevices therein. In accordance with Mayhew, the effective concentration of the granular gilsonite in the aqueous liquid carrier ranges from as little as 10 to as much as 50 pounds per barrel (ppb) of the mixture for most common cases of lost circulation, and for severe conditions this concentration may be increased to as much as 100 pounds per barrel.

In U.S. Pat. No. 2,573,690 to Cardwell et al. there is described a method of treating earth formations wherein a filler, which is a solid substance in granular form in two ranges of particle size, one being coarse and corresponding in size to the channel fissures and cracks, the other comparatively fine and corresponding in size to the particles of the formation to be consolidated, is used in conjunction with an earth consolidating resin-forming liquid mixture. Among those substances suggested as filler are walnut shells, pecan shells, coconut shells, and gilsonite.

Other granular materials used in the control of loss of fluid into formations include coal and coke. For example, in U.S. Pat. No. 2,650,195 to Cardwell et al., there is disclosed a method of controlling the loss of fluid into formations by providing a cohesive resinous coating upon filterable inert solid particles which are added to the fluid so as to form a filter cake of self-bonding particles when a thief zone is encountered. Various filler materials which are disclosed include coke, coal, cinders, and nut shells. The "coke" which has been used in these prior art techniques has been derived from coal by subjecting coking coal to partial oxidation in coke ovens.

U.S. Pat. No. 3,788,406 to Messenger describes addition of an emulsifying agent and a large amount of ground coal or asphaltic oil-wettable granular particles to control lost circulation.

U.S. Pat. No. 4,957,174 to Whitfill et al. describes a method of correcting lost circulation, after it has been encountered, by adding particulate petroleum coke particles in a specific size range to essentially plug off openings in a thief zone.

U.S. Pat. No. 3,053,764 to Hummel et al. describes a method of controlling lost circulation by addition to the drilling fluid of a mixture of large particles of coke and bentonite.

SUMMARY OF THE INVENTION

According to the present invention, fracture initiation and propagation during well drilling is prevented or inhibited by including in the drilling fluid an effective concentration of a specially sized particulate solid material. The solid material inhibits initiation of fractures, and controls propagation of any fractures that are formed. The preferred inhibiting materials are nut shells or calcined petroleum coke, both of which are environmentally acceptable and do not significantly alter the rheology of drilling fluid even when present in amounts of 30 to 50 or more pounds per barrel of drilling fluid. Nut shells have a particular advantage in that they are very resistant to size degradation. Other particulate solid materials, such as calcium carbonate, glass or ceramics, polymer beads or the like can be used, but in some cases when using these other materials the drilling fluid rheology may be adversely affected, while in other cases handling problems, floating or settling of the particles in the drilling fluid due to too great a density difference between the particles and the fluid, size degradation or cost may be a deterrent.

The mechanics of operation of the method of this invention require that an effective amount of material (as determined by calculation shown below) in the 250 to 600 micron size range be used. Small amounts of material outside this critical size range may be present, but do not contribute significantly to inhibition of fracture initation and propagation.

DESCRIPTION OF THE PREFERRED EMBODIMENTS

Inhibition of fracture initiation and propagation in accordance with the invention is effective with both oil-based and water-based drilling fluids. The method is not intended as a lost circulation control in cases where large fractures or faults are encountered, nor in situations where "thief" zones are encountered. The method is preventive rather than remedial in nature. The method is effective in preventing formation breakdown both during actual drilling and also when running casing into the hole or performing completion operations.

The method is very effective in pressure-depleted zones, which tend to induce lost circulation problems. The method is also effective in tectonically active zones, especially when drilling horizontally or at a high angle to vertical, such as greater than 40 degrees from vertical. The method is also effective in highly permeable shale or sand zones and in strong formations with highly directional in-situ stresses. The method is not appropriate for combatting fluid loss in vuggy structures, in zones having large open fractures, or in shallow zones that are loosely consolidated with gravel and/or large pores.

Prevention of lost circulation in accordance with the invention is far more cost-effective than remedial action taken after the occurrence of lost circulation. Especially when oil-based drilling fluids are being used, fluid losses can be very expensive, unsafe (subterranean blowout) and time-consuming. Thus, adding the fracture inhibitor to the drilling fluid provides a margin of fracture protection for the drilling mud weights used and reduces the degree of uncertainty involved with drilling operations. The procedure is particularly appropriate for use in lost-circulation-prone zones or in high-angle (greater than 40 degrees from vertical) or horizontal drilling where a higher mud weight is required to counter potential borehole collapse or compressive failure.

As mentioned above, the preferred materials for adding to the drilling fluid are crushed and sized nut shells or calcined petroleum coke. These materials are very inert, are environmentally acceptable, and have little if any effect on drilling fluid rheology even when present at levels of more than 50 pounds per barrel of drilling fluid. They are also within the preferred specific gravity range of from 1.2 to 2.0. Materials in this range are resistant to floating and settling in the drilling fluid. Other solid particulate materials may be used, such as calcium carbonate, gilsonite, glass and ceramics, polymer beads, etc. These materials may, however, affect the rheology of the drilling fluid to the extent that compensating chemical treatment may be necessary.

The concentration of material used may vary with the drilling fluid used and the conditions of use. The concentration must at least be great enough to provide an effective inhibition of fracture initiation and propagation, but should not be so high as to make circulation of the drilling fluid impractical. The most preferred concentration of particulate material as determined by laboratory tests and actual field tests, can be calculated by the following equation:

$$C = SG(3.5\ MW - 14.0)$$

C: Concentration of particulate material in pounds per barrel of drilling fluid
SG: Specific gravity of particulate material
MW: Mud weight in pounds per gallon A concentration of particulate material that is within ±20% of the concentration calculated by the above equation is acceptable.

In many cases, the need for the additive will coincide with the need for a heavier drilling fluid, so drilling fluid weighting additives and fracture inhibition additives may be added to the drilling fluid more or less simultaneously.

The critical size range of the fracture inhibiting additive has been determined to be between about 250 and 600 microns, or −30/+60 mesh (U.S. Sieve Series), with a preference for at least 75 percent of the additive to be in the −35/+50 mesh cut.

The mechanism by which the additive works is that as an incipient fracture is induced in a zone, the additive particles "screen-out" at the fracture tip due to fluid leak-off and resulting particle concentration at the fracture tip. The additive provides an excellent fluid sealing property and thus increases fracture resistance by "screen-out" continuously during fracture formation and propagation, preventing or minimizing loss of drilling fluid.

The effectiveness of the method has been demonstrated in both laboratory and field conditions as shown by the following Examples.

EXAMPLE I

In this example, large blocks of Berea sandstone were subjected to pressure from a 16 pound per gallon (ppg) oil-based drilling fluid, first without the loss prevention material of this invention, and then with 80 pounds per barrel (ppb) of crushed and calcined petroleum coke (−30/+60 mesh) added to the drilling fluid. The fracture propagation pressure with the fluid containing added coke was from 1,700 to 3,300 psi greater than for the drilling fluid without the added coke. This result indicates that an increase in drilling fluid weight of from 3.2 to 6.3 ppg could be used at a depth of 10,000 feet without encountering formation breakdown or lost circulation. The freedom to use a significantly higher weight drilling fluid without losing drilling fluid into the formation translates into an ability to drill greater depth intervals without the necessity for setting intermediate casing strings. Elimination of even one casing string results in major savings in time and equipment costs. Also, it enables drilling of smaller diameter holes, with resultant economic and environmental benefits, especially in offshore operations.

EXAMPLE II

A procedure similar to that of Example I was carried out using a 10 ppg water-based drilling fluid with and without 40 ppb of crushed (−30/+60 mesh) and calcined petroleum coke. An increase in fracture propagation pressure of more than 4,000 psi resulted from using the added coke in the drilling fluid. Comparable results were obtained using other drilling fluids at different fluid weights.

EXAMPLE III

In this example, an oil field in Ventura, Calif. included a group of wells which could not be drilled with drilling fluid heavier than 11.5 ppg due to formation breakdown from the hydrostatic pressure of the drilling fluid. An openhole leak-off test of a well in this field was conducted using a fluid containing crushed and sized calcined petroleum coke. This test showed that a fluid weight of greater than 13.0 ppg could be used without encountering formation breakdown. The fracture resistance or breakdown pressure at the casing shoe was increased from an equivalent mud weight of 12.0 ppg without the coke to 15.8 ppg with the added coke.

EXAMPLE IV

In this example, formation breakdown tests were conducted in several formation intervals of a test well in Newkirk, Oklahoma. In a permeable and competent sandstone formation, the borehole breakdown pressure was increased by an equivalent 8.0 ppg when 40 ppb of −30/+60 mesh coke was added to a water-based drilling fluid. The fracture propagation pressure in the same formation was increased by 5.0 to 6.0 ppg. During the test, observance of abrupt increases in the injection pressure shortly after fracture initiation indicated that coke "screen-out" had occurred at the fracture tip.

EXAMPLE V

In this example, a well was drilled through an interval of 866 feet using a drilling fluid containing a 40–45 ppb concentration of crushed walnut shells (−30/+60 mesh) without any significant loss of drilling fluid. At the end of the drilling portion of the test, a static leak-off test was performed in a 4,366 foot interval of open hole. The fracture resistance at the casing shoe was increased from an equivalent mud weight of 12.2 ppg without the walnut hulls to 15.0 ppg with the walnut hulls.

The size range of the fluid loss prevention material in accordance with the invention is critical, and has been determined to be in the 250–600 micron range. Particles in this range are just slightly larger than the created fracture tip width and the thickness of the mud cake formed at the fracture surfaces. The plugging mechanism is a result of particle "screen-out" due to fluid leak-off and solids concentration at the fracture tip. Minor amounts of particles outside the critical size range can be tolerated, but the effectiveness is primarily due to presence of an effective amount of particles in the critical size range. Most preferably, a major portion of the particles are in the −35/+50 mesh range. Crushed nut shells and calcined shot petroleum coke are preferred materials due to their resistance to size degradation, inertness, density, cost and acceptability from the standpoint of environmental considerations. Also, they have little if any adverse effect on the rheology of drilling fluids even when present in high concentration.

We claim:

1. A method of increasing fracture initiation pressure and fracture propagation pressure during well drilling with a circulating drilling fluid comprising adding to said drilling fluid, prior to encountering formation breakdown, a solid particulate loss prevention material having a size range of from 250 to 600 microns in a concentration which is within ±20 percent of that determined by the equation $C = SG(3.5 MW - 14.0)$.

2. The method of claim 1 wherein said loss prevention material is selected from the group consisting of petroleum coke, gilsonite, calcium carbonate, glass, ceramics, polymeric beads and nut shells.

3. The method of claim 1 wherein said loss prevention material is at least 75 percent by weight in a size range of from −35/+50 mesh.

4. The method of claim 1 wherein said loss prevention material is comprised of crushed walnut shells.

5. The method of claim 1 wherein said loss prevention material is comprised of crushed petroleum coke.

6. The method of claim 1 wherein said well is being drilled at an angle of greater than 40 degrees from vertical.

7. The method of claim 1 wherein said well is being drilled through at least one formation selected from the group consisting of sand zones, permeable shale zones, pressure-depleted zones and tectonically active zones.

* * * * *